Figure 1:
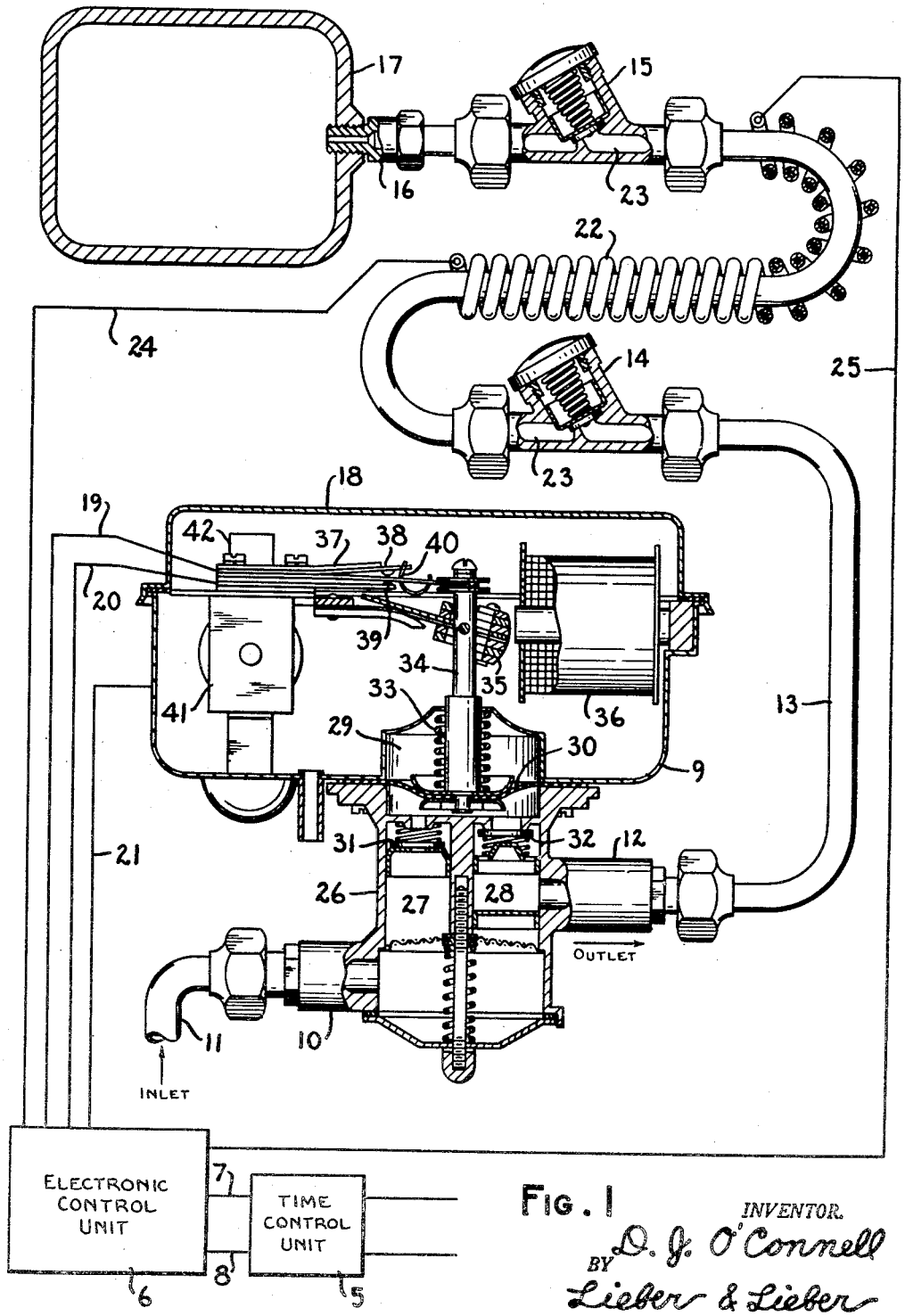

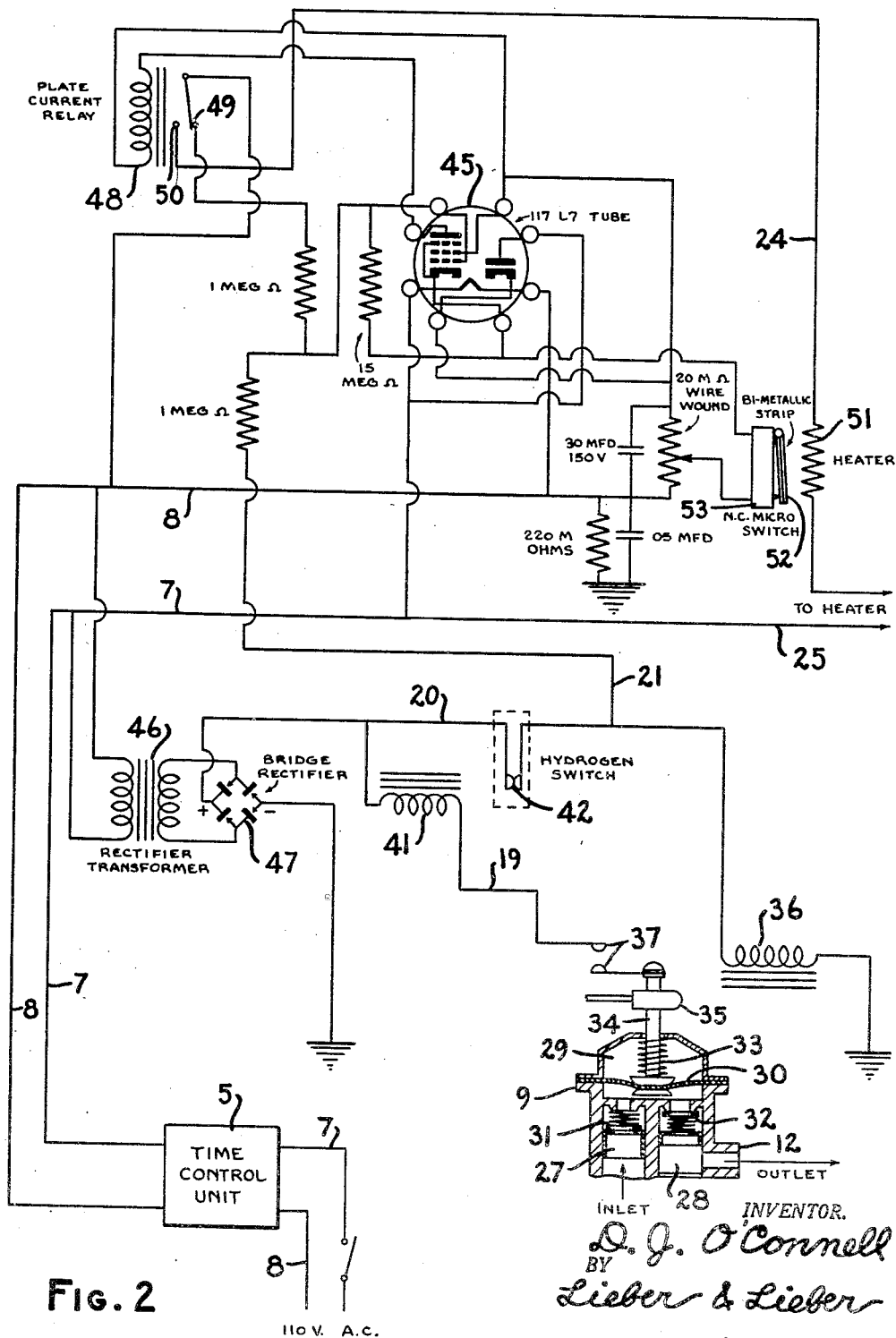

Patented Dec. 26, 1950

2,535,752

UNITED STATES PATENT OFFICE 2,535,752

INJECTION SYSTEM AND APPARATUS THEREFOR

Donald J. O'Connell, Milwaukee, Wis., assignor to Clement A. Makowski, Milwaukee, Wis.

Application April 4, 1947, Serial No. 739,455

6 Claims. (Cl. 103—1)

The present invention relates generally to improvements in control systems and apparatus, and relates more particularly to improvements in the construction and operation of automatic electronically controlled injection systems.

A primary object of my present invention is to provide an improved electronically controlled injection assemblage which is simple, compact, and durable in construction, and which is moreover highly efficient and automatic in operation.

There are numerous instances in which it is necessary and/or desirable to inject or introduce certain materials into water or steam systems, manufacturing processes, and the like. Some examples of such instances are as follows: the injection of material into natural gas lines or the like to produce odors at regularly spaced intervals; the injection of fluids into hydraulic systems to remove air bubbles or pockets; the proportioning injection of materials into water conditioning systems; the injection of certain scale preventing agents or compounds into individual radiators in hydrostatic as well as hot water heating systems; the injection of materials into locomotive steam systems; the injection of certain chemicals into pipe lines and the like in processing industries to neutralize and clean deposits; the injection of materials in tire making processes; the injection and/or supply of controlled amounts of pre-heated fuel for use in Diesel engines and the like; the periodic injection of cleaning material to turbine blades; the injection of chemicals in diverse processes; the injection of one or more different fluids into a common chamber for causing controlled explosions or the like; the injection of materials into unsealed systems of ships and the like; and the injection of diverse materials into heating and other systems.

Various injection systems and methods and controls therefor have heretofore been proposed; but for the most part, these prior systems have been objectionable for one or more reasons. In the majority of cases, the prior proposed injection system has necessitated the use of relatively complicated, bulky and expensive apparatus requiring careful attention and constant maintenance. Furthermore, these prior systems were not completely automatic and necessitated continual care and expert individual attention by way of manual control. In addition, some of these prior systems required the use and development of considerably high pressures and heats which is, of course, dangerous due to the possibility of explosion. The apparatus utilized in these prior systems has also been found to require considerable periodic repair and replacement of parts; and in most cases, the operating cycle of the system was found unnecessarily long with considerable consumption of electrical energy and high current required for operation.

It is therefore a more specific object of this invention to provide an improved control system and apparatus adapted to be utilized for injecting diverse materials into containers, vessels, pipe lines, machinery, cylinders, or the like in innumerable systems, and in which the objectionable characteristics of prior systems are obviated.

Another specific object of my invention is to provide an improved method of and apparatus for injecting materials into conduits or the like at predetermined periods of time and at pressures either above or below atmospheric, the injections being automatically controlled by electronic means.

Another specific object of the invention is to provide an improved new and useful and highly efficient injection system and apparatus, wherein the volume of material injected or introduced in finely divided form is automatically closely controlled.

Another specific object of the invention is to provide a safe and completely automatic time-controlled injection system and apparatus which has numerous adaptations, which is not influenced by surrounding conditions, and which is exceedingly economical in operation.

An additional specific object of the present invention is to provide an improved automatic electronically actuated time-controlled injection system and apparatus which is composed of relatively few simple parts which may be readily furnished, assembled and operated at extremely low cost.

A further specific object of the present invention is to provide an improved automatically controlled injection system and apparatus which is effectively sealed, which requires minimum attention, and wherein all parts are readily accessible for inspection and repair.

These and other specific objects and advantages of the invention will be apparent from the following detailed description.

A clear conception of the features constituting my present improvement, and of the construction, assemblage and mode of operating apparatus embodied in my new system, may be had by referring to the drawing accompanying and forming a part of this specification wherein like reference characters designate the same or similar parts in the various views.

Fig. 1 is a somewhat diagrammatic and sectional view showing typical mechanisms for introducing and controlling the periodic injection of colloids or the like into a receiving conduit, in accordance with this invention; and Fig. 2 is an electrical wiring diagram showing the method of correlating the electronic, electrical, and mechanical operations of the improved system.

While my invention has been shown and described herein as being specifically applied to a particular system for introducing and controlling the periodic injection of colloids into a conduit, it is not my desire or intention to thereby limit the scope or utility of the improvement to such typical embodiment.

Referring to the drawing, the typical system shown therein as embodying the invention comprises, in general, a time control unit or clock 5; an electronic control unit 6 periodically receiving electric energy from the power lines 7, 8 under control of the timing unit 5; an electrically actuated pump 9 having the inlet 10 thereof communicating with a supply of colloids or the like through a conduit 11 and having the outlet 12 communicating, through a conduit 13 past spaced check valves 14, 15 and an atomizing nozzle 16, with a receiving conduit 17 into which it is desired to periodically inject predetermined amounts of colloids, the pump actuating mechanism housed within the upper pump casing 18 receiving current from the electronic control unit 6 through electric conduits 19, 20, 21; and a resistance element or heating coil 22 surrounding the conduit 13 adjacent the cavity 23 formed therein between the check valves 14, 15, the resistance element 22 also being connected with the electronic control unit 6 by electric conduits 24, 25.

The electrically actuated pump 9 is of the diaphragm type and is of well-known construction and may be purchased on the open market. The pump 9 comprises, in general, upper and lower casing sections 18, 26 respectively; inlet and outlet chambers 27, 28 respectively formed in the lower section 26; a diaphragm chamber 29 formed above the chambers 27, 28 and having a diaphragm 30 therein; inlet and outlet valves 31, 32 respectively between the inlet and outlet chambers 27, 28 respectively and the diaphragm chamber 29; a spring 33 for moving the diaphragm 30 on its discharge or downward stroke; a pull rod 34 for the diaphragm 30; a pump armature 35 pivotally connected to the rod 34; an electromagnet 36 for attracting the armature 35 to move the diaphragm 30 in opposition to the spring 33; and switch means 37 for controlling the magnet 36, the switch means 37 including a pair of normally open or spaced contact blades 38, 39 adapted to be closed by the action of a toggle spring 40 upon upward movement of the armature 35 thereby energizing a coil 41 to magnetically open a hydrogen switch 42 and break the circuit to de-energize the electromagnet 36 permitting the diaphragm spring 33 to return the diaphragm to lowermost position and deliver fluid to the outlet 12, whereupon the spring 40 is returned to the position shown and opening the blades 38, 39 of switch 37 to de-energize coil 41 and close the hydrogen switch 42. The operation cycle of the pump is, of course, repeated until the time control unit 5 cuts off the power supply to the pump 9. The check valves 14, 15 may be of the spring-pressed type, and the conduit 17 may be any conduit, vessel or the like into which it is desired to periodically inject or introduce a material.

With particular reference to Fig. 2, the control action of the improved system is as follows: Power from the electrical power lines 7, 8 is periodically applied to a vacuum tube 45 and to a transformer 46 by the predetermined operation of the adjustable electrical time controlling device 5. The application of electrical power to the vacuum tube 45 and rectifier transformer 46 causes a bridge type dry disc rectifier 47 to apply D. C. voltage to the pump 9, which has been hereinabove described. When actuated, the pump 9 transmits an impulse to the vacuum tube 45, such impulse momentarily reducing to zero the grid bias voltage on vacuum tube 45 thus effecting a rise in plate current flowing to the vacuum tube 45 sufficient to operate a plate current relay 48. Operation of the relay 48 breaks the contact 49, thereby removing the above-mentioned bias voltage from the vacuum tube 45 for the duration of the cycle; and such operation of relay 48, furthermore effects contact at the point 50, thereby causing application of electrical power to the resistance element 22 in Fig. 1. The electrical current flowing to the resistance element 22 in Fig. 1 through the conduit 24 generates heat in a bi-metallic strip 52 by means of a resistance element or heater 51. After a period governed by the position of a micro-switch 53 in relation to the bi-metallic strip 52, the micro-switch 53 is opened, thereby causing the relay 48 to return to rest position ready to start a new cycle at the next succeeding pulse of the pump 9.

With more particular reference now to Fig. 1, the improved method of injecting or introducing fluids and/or colloids as accomplished with my new system is as follows: As power is supplied to the pump 9 under control of the electronic control unit 6, the electromagnet 36 is energized causing the pump armature 35, rod 34 and diaphragm 30 to move upwardly against the resistance of the spring 33, thereby causing valve 31 to open and drawing fluid or the like from a container, not shown, through the conduit 11, pump inlet 10 and inlet chamber 29 into the diaphragm chamber 29 below the diaphragm 30. As the rod 34 is raised, the toggle spring 40 is caused to close the contacts 38, 39 of the switch 37 thereby energizing the coil 41 to magnetically open the hydrogen switch 42 and break the circuit to the electromagnet 36, de-energizing the same and permitting the diaphragm spring 33 to return the diaphragm to lowermost position which causes opening of the discharge valve 32 and discharge of the fluid in the chamber 29 into the discharge chamber 28 and through the outlet 12 and conduit 13. This cycle is repeated with the pump 9 forcing the fluid or other material at relatively low pressure through the conduit 13 and past the check valve 14 into the section or cavity 23 between the valves 14, 15, where it becomes entrapped, the spring tension on check valve 15 being sufficient to overload the pump 9. As hereinabove described with particular reference to Fig. 2, the actuation of the pump 9 causes electrical power to flow to the resistance element 22, thereby resulting in a rise of temperature in the cavity 23 and heating the fluid and/or colloids entrapped in this cavity between the check valves 14, 15. This increase in temperature results in the expansion of the fluid or other material within the cavity 23 to the point where it overcomes the spring tension and adverse pressure on the check valve 15; and upon expansion, such fluid passes through the valve 15 and the atomizing nozzle 16 into the receiving conduit or vessel 17, the heated and expanded fluid or the like being broken into extremely fine particles which will readily combine with any fluid, vapor or gas upon passage through the atomizer 16.

While the improved system has been shown and described as embodying a diaphragm pump of a particular type, spring pressed check valves of well-known construction, and certain other apparatus of specific design, various modifications may, of course, occur to persons skilled in the art without departing from the spirit of the invention and good results may be obtained with somewhat modified apparatus.

From the foregoing detailed description, it will be apparent that my present invention provides an improved injection system and apparatus and automatic control therefor which is extremely simple and compact and which is completely automatic and efficient in operation. The time control unit 5 may be of any standard construction and may be adjusted in a simple manner to automatically set the electronic control unit 6 into operation at any desired periods of time; and the operation of the pump 9 and resistance element 22 is in turn correlated and controlled by the electronic unit 6. The electronically controlled injection system presents a novel and improved method of introducing materials into a conduit, container, or the like in a finely divided state such as will induce mixing; and the improved assemblage may obviously be readily adapted to diverse fields. The control for the improved injection apparatus and method may be adjusted by a novice for causing injection of the desired materials into the receiving conduit, vessel, or the like at predetermined intervals at pressures either above or below atmospheric; and the assemblage is unaffected and not influenced by surrounding conditions. The volume of material periodically introduced into the receiving conduit 17 or the like in atomized form is automatically closely controlled in a simple and effective manner; and the improved assemblage consists of relatively few inexpensive and standard parts which require little attention and which are extremely economical in operation. The supply and discharge conduits for the material being injected are effectively sealed, and all parts of the assemblage may be arranged so as to provide ready access for inspecting and the like; and it should be noted that although the valves 14, 15 have been shown as being of the spring-pressed type, they may obviously be of ball, cone or other type and may be electrically controlled. The improved system and apparatus have proven highly satisfactory and successful in actual use.

It should be understood that it is not my desire or intention to limit this invention to the exact steps of the method or to the precise details of construction or mode of operation, herein shown and described, for various modifications within the scope of the appended claims may occur to persons skilled in the art to which this invention pertains, and it is also contemplated that specific terms employed herein shall be given the broadest interpretation consistent with the general disclosure.

I claim:

1. Apparatus for injecting material into a receiving vessel comprising, a receiving vessel, means for conducting a supply of the material to a confined space to completely fill the latter, means externally of said confining space for heating the material within the confined space to expand the same, and means for releasing the expanded material from said space and for introducing the same into the receiving vessel.

2. Apparatus for injecting material into a receiving vessel comprising, a receiving vessel, an electronic control unit, means operable by said electronic unit for conducting a supply of the material to a confined space to completely fill the latter, means externally of said confining space and also operable by said electronic control unit for heating the material within said space to expand the same, and means for releasing the expanded material from said space and for introducing the same into the receiving vessel.

3. Apparatus for injecting material into a receiving vessel comprising, a receiving vessel, an electronic control unit, means for automatically supplying power to said electronic unit at predetermined periods of time, means operable by said electronic unit for conducting a supply of the material to a confined space to completely fill the latter, means externally of said confining space and also operable by said electronic control unit for heating the material within said space to expand the same, and means for releasing the expanded material from said space and for introducing the same into the receiving vessel.

4. Apparatus for injecting material into a receiving vessel comprising, a receiving vessel, a conduit communicating with a supply of the material and with said receiving vessel, a pump for forcing material through said conduit toward said vessel, means associated with said conduit and forming a material entrapment space therein on the discharge side of said pump for completely confining successive batches of the material alone, means externally of said entrapment space for heating the material entrapped within said space to expand the same, and means for releasing the expanded material from said space in the form of a spray and for introducing the same into the receiving vessel.

5. Apparatus for injecting material into a receiving vessel comprising, a receiving vessel, a conduit communicating with a supply of the material and with said receiving vessel, a pump for forcing material through said conduit toward said vessel, means associated with said conduit and forming a material entrapment space therein on the discharge side of said pump for completely confining successive batches of the material alone, means externally of said entrapment space for heating the material entrapped within said space to expand the same, means for releasing the expanded material from said space and for introducing the same into the receiving vessel, and means for electronically controlling the operation of the system.

6. Apparatus for injecting material into a receiving vessel comprising, a receiving vessel, a conduit communicating with a supply of the material and with said receiving vessel, a pump for forcing material through said conduit toward said vessel, means associated with said conduit and forming a material entrapment space therein on the discharge side of said pump for completely confining successive batches of the material alone, means externally of said entrapment space for heating the material entrapped within said space to expand the same, means for releasing the expanded material in the form of a spray from said space and for introducing the same into the receiving vessel, means for electronically controlling the operation of the system, and means for automatically controlling the periodic operation of said electronic control means.

DONALD J. O'CONNELL.

REFERENCES CITED

The following references are of record in the file of this patent:

UNITED STATES PATENTS

| Number | Name | Date |
|---|---|---|
| 379,674 | Bolmer | Mar. 20, 1888 |
| 632,663 | Tatham | Sept. 5, 1899 |
| 1,750,229 | LasMolles | Mar. 11, 1930 |
| 1,847,286 | Weaver | Mar. 1, 1932 |
| 2,272,477 | Pfleger | Feb. 10, 1942 |